(12) United States Patent
Inagaki et al.

(10) Patent No.: US 9,374,030 B2
(45) Date of Patent: Jun. 21, 2016

(54) GENERATOR EXCITATION APPARATUS AND POWER CONVERSION SYSTEM

(71) Applicant: KABUSHIKI KAISHA TOSHIBA, Tokyo (JP)

(72) Inventors: Katsuhisa Inagaki, Higashiyamato (JP); Kentaro Suzuki, Hachioji (JP); Ryuta Hasegawa, Hino (JP); Teruyuki Ishizuki, Tokyo (JP); Kiyoshi Kusunoki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 12 days.

(21) Appl. No.: 14/314,127

(22) Filed: Jun. 25, 2014

(65) Prior Publication Data

US 2015/0002106 A1     Jan. 1, 2015

(30) Foreign Application Priority Data

Jun. 28, 2013     (JP) .................................. 2013-136326

(51) Int. Cl.
*H02P 9/46* (2006.01)
*H02P 9/30* (2006.01)
(Continued)

(52) U.S. Cl.
CPC ................. *H02P 9/302* (2013.01); *H02M 1/32* (2013.01); *H02M 5/4585* (2013.01); *H02M 7/487* (2013.01); *H02M 7/493* (2013.01); *H02P 9/38* (2013.01); *H02M 1/14* (2013.01)

(58) Field of Classification Search
CPC ..................................... H02P 9/00; H02P 9/10
USPC .......... 318/400.01, 400.02, 400.14, 700, 701, 318/727, 799, 800, 801, 430, 432, 44; 322/6, 9, 10, 14, 17, 44, 47, 51; 363/40, 44, 52, 55, 67, 71
See application file for complete search history.

(56) References Cited

U.S. PATENT DOCUMENTS 4,218,646 A     8/1980   Akamatsu
6,169,677 B1 *  1/2001   Kitahata et al. ................. 363/71
(Continued)

FOREIGN PATENT DOCUMENTS

CN     101490941 A     7/2009
CN     1027-42149 A    10/2012
(Continued)

OTHER PUBLICATIONS

European Search Report, issued by the European Patent Office, in a counterpart European Application No. 14174839.2, mailed Dec. 17, 2015.
(Continued)

*Primary Examiner* — Antony M Paul
(74) *Attorney, Agent, or Firm* — Finnegan, Henderson, Farabow, Garrett & Dunner, LLP

(57) ABSTRACT

According to one embodiment, there is provided a generator excitation apparatus including a plurality of first power converters and a second power converter. The plurality of first power converters are electrically connected to windings of respective phases of rotors of a wound rotor type induction generator in which the windings of the rotors of the respective phases are electrically independent, and are configured to bidirectionally convert DC and AC. The second power converter is configured to bidirectionally convert DC and AC between DC sides of the first power converters and a three-phase DC power supply. The DC sides of the first power converters are electrically connected together to a DC side of the second power converter.

6 Claims, 2 Drawing Sheets

(51) Int. Cl.
*H02M 5/458* (2006.01)
*H02P 9/38* (2006.01)
*H02M 7/487* (2007.01)
*H02M 1/32* (2007.01)
*H02M 7/493* (2007.01)
*H02M 1/14* (2006.01)

(56) References Cited

U.S. PATENT DOCUMENTS 7,554,302 B2 * 6/2009 Schauder .................. 322/44
2007/0063677 A1 3/2007 Schauder
2009/0045782 A1 * 2/2009 Datta et al. .................. 322/17
2009/0161398 A1 6/2009 Benaboud et al.
2012/0217749 A1 8/2012 Castelli Dezza et al.

FOREIGN PATENT DOCUMENTS

| EP | 2472107 | 7/2012 |
| JP | 09-182451 | 7/1997 |
| WO | WO 2011/055175 | 5/2011 |

OTHER PUBLICATIONS

Notication of the First Office, issued by the Chinese Patent Office, in a counterpart Chinese Patent Application No. 201410296665.5, dated Apr. 1, 2016.

* cited by examiner

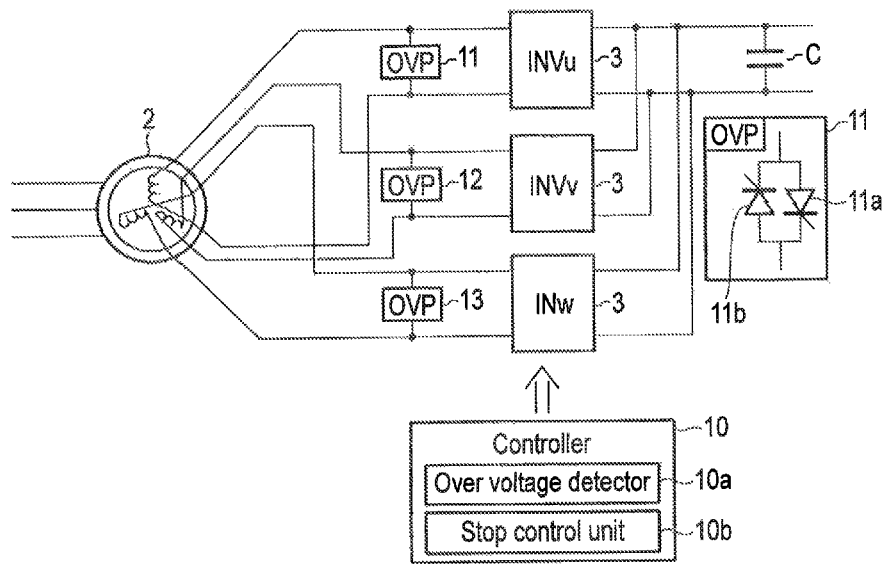
F I G. 2
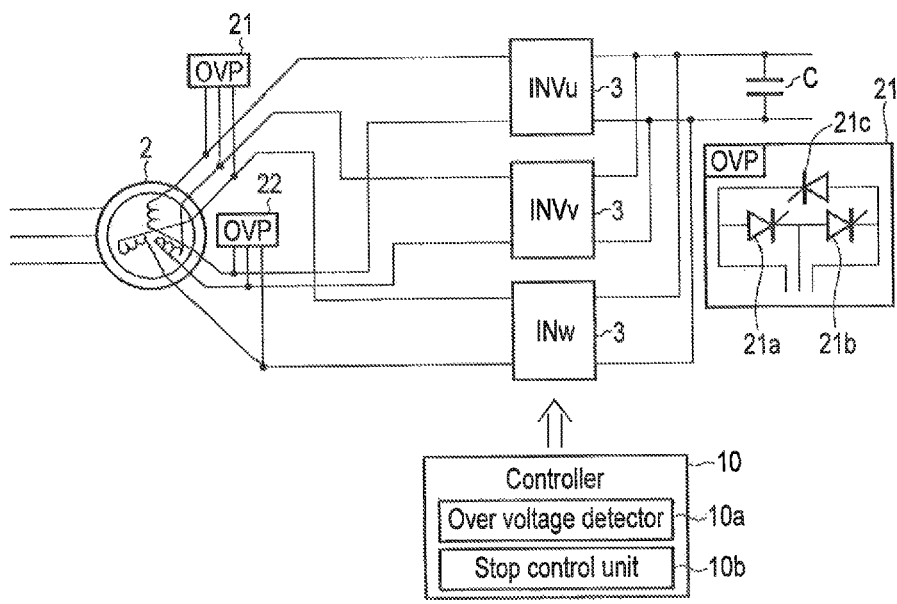
F I G. 3

US 9,374,030 B2

GENERATOR EXCITATION APPARATUS AND POWER CONVERSION SYSTEM

CROSS-REFERENCE TO RELATED APPLICATION

This application is based upon and claims the benefit of priority from Japanese Patent Application No. 2013-136326, filed Jun. 28, 2013, the entire contents of which are incorporated herein by reference.

FIELD

Embodiments described herein relate generally to a generator excitation apparatus and power conversion system.

BACKGROUND

A wound rotor type induction generator is used in a power generation system having a variable power generator speed, e.g., a hydroelectric power generation system. The rotational speed of this wound rotor type induction generator is controlled by controlling the excitation frequency from the rotor side as the secondary side of the generator. To obtain a variable-frequency/variable-voltage-amplitude output from the generator, a semiconductor power converter is recently used as a secondary excitation power supply in most cases.

A conventional semiconductor power converter for a secondary excitation power supply is required to have a high power and high voltage. Therefore, it is necessary to combine a plurality of power converters in series or parallel, and use a special reactor or transformer for connection.

To obviate the need for a special component like this, there is a circuit system having a full-bridge configuration using three single-phase-output NPC (Neutral-Point-Clamped) inverters (DC→AC power converters) as semiconductor power converters.

The output power from the single-phase-output NPC inverter described above pulsates at a period twice that of the output-voltage frequency. Under this influence, a DC link voltage as the voltage of a DC link capacitor between the NPC inverter and a converter fluctuates at the same period.

Since the output frequency of the secondary excitation power supply is at most about a few Hz, i.e., very low, the fluctuating voltage width increases. To avoid this large fluctuation, the capacity of the DC link capacitor can be increased. However, if the capacity of the DC link capacitor is increased, the size and cost of the apparatus unavoidably increase.

BRIEF DESCRIPTION OF THE DRAWINGS

FIG. 2 is a view showing an installation example of the OVP circuit in a secondary excitation system of a wound rotor type induction generator according to the second embodiment; and FIG. 3 is a view showing an installation example of OVP circuits of a secondary excitation system of a wound rotor type induction generator according to the third embodiment.

DETAILED DESCRIPTION

Figure 1:
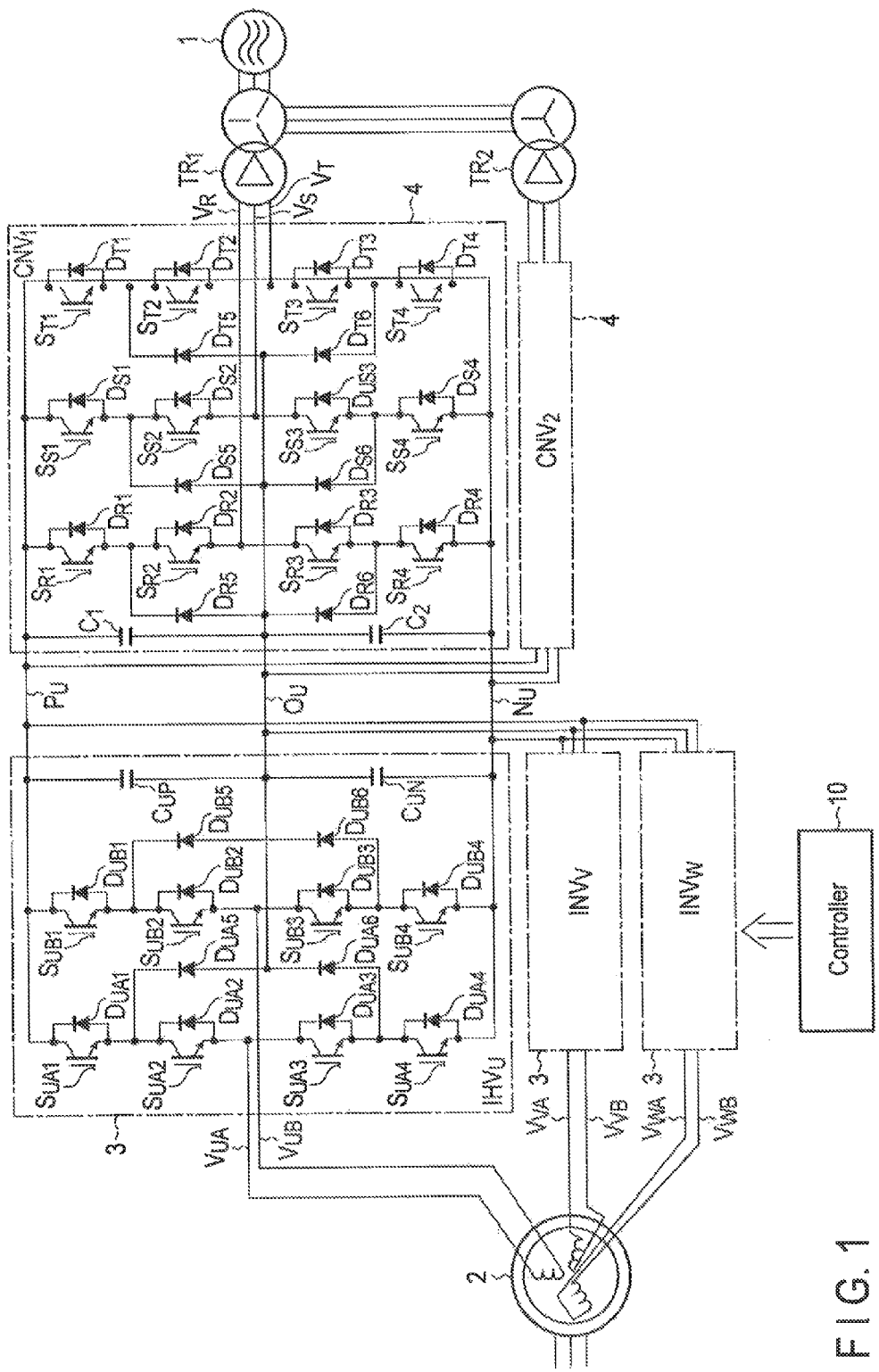
FIG. 1 is a view showing a circuit configuration example of a secondary excitation system of a wound rotor type induction generator according to the first embodiment.

In general, according to one embodiment, there is provided a generator excitation apparatus including a plurality of first power converters and a second power converter. The plurality of first power converters are electrically connected to windings of respective phases of rotors of a wound rotor type induction generator in which the windings of the rotors of the respective phases are electrically independent, and are configured to bidirectionally convert DC and AC. The second power converter is configured to bidirectionally convert DC and AC between DC sides of the first power converters and a three-phase DC power supply. The DC sides of the first power converters are electrically connected together to a DC side of the second power converter.

Embodiments will be explained below with reference to the accompanying drawings.

First Embodiment

First, the first embodiment will be explained.

FIG. 1 is a view showing a circuit configuration example of a secondary excitation system of a wound rotor type induction generator according to the first embodiment.

The secondary excitation system of the wound rotor type induction generator according to the first embodiment includes a three-phase AC power supply 1 and wound rotor type induction generator 2. In this system, the rotational speed of the wound rotor type induction generator 2 is controlled by controlling the frequency of a voltage to be applied to the excitation winding of the wound rotor type induction generator 2 as a three-phase AC load.

In an ordinary wound rotor type induction generator according to a related art, the connection of the three-phase excitation windings on the rotor side is a star connection. On the other hand, in this embodiment as shown in FIG. 1, the connection of the three-phase excitation windings of the wound rotor type induction generator 2 is an open-star connection in which the winding of each phase is electrically independent.

The two ends of the excitation winding of each phase of the wound rotor type induction generator 2 are electrically connected to two legs forming a single-phase, full-bridge inverter unit 3.

Three single-phase, full-bridge inverters of respective phases of this secondary excitation system are electrically connected to the same DC link portion.

An apparatus for supplying electric power to this DC link portion is an ordinary three-phase AC/DC semiconductor power converter (PWM (Pulse Width Modulation) rectifier).

When viewed from the wound rotor type induction generator 2 in this secondary excitation system, the inverter unit 3 corresponding to each phase of the wound rotor type induction generator 2 is electrically connected to at least one converter unit 4. The converter unit 4 is electrically connected to a converter transformer.

The converter unit 4 temporarily converts a three-phase AC voltage E from the three-phase AC power supply 1 into a DC voltage. In addition, the inverter unit 3 converts this DC voltage into an arbitrary AC voltage having an arbitrary frequency, and supplies the voltage to the excitation winding of the wound rotor type induction generator 2. In this embodiment, the three phases of the power system are called RST phases, and the three phases of the wound rotor type induction generator 2 are called UVW phases.

In the example shown in FIG. 1, in this secondary excitation system, a first converter transformer $TR_1$ and first converter unit $CNV_1$ for converting the three-phase AC voltage E into a DC voltage are electrically connected in series. Also, a second converter transformer $TR_2$ and second converter unit $CNV_2$ for converting the three-phase AC voltage E into a DC voltage are electrically connected in series.

The arrangement of the converter unit 4 will be explained by taking the first converter unit $CNV_1$ as an example. The arrangement of the second converter unit $CNV_2$ is the same as this arrangement.

The first converter unit $CNV_1$ is a three-phase, neutral-point-clamped (NPC) device. In the converter unit $CNV_1$, the three NPC legs corresponding to the three phases, i.e., the RST phases are electrically connected in parallel, thereby forming a three-phase, half-bridge configuration. The output terminals at the neutral points of the three NPC legs of the converter unit $CNV_1$ are electrically connected to the DC winding of the first converter transformer $TR_1$. The converter unit $CNV_1$ has DC voltage terminals. The DC voltage terminals include a high-potential-side terminal, neutral-point-side terminal, and low-potential-side terminal. A DC link capacitor $C_1$ is formed between the high-potential-side terminal and neutral-point-side terminal of the converter unit $CNV_1$. Also, a DC link capacitor $C_2$ is formed between the neutral-point-side terminal and low-potential-side terminal of the converter unit $CNV_1$.

The high-potential-side terminal of the second converter unit $CNV_2$ is electrically connected to the high-potential-side terminal of the first converter unit $CNV_1$.

The neutral-point-side terminal of the second converter unit $CNV_2$ is electrically connected to the neutral-point-side terminal of the first converter unit $CNV_1$.

The low-potential-side terminal of the second converter unit $CNV_2$ is electrically connected to the low-potential-side terminal of the first converter unit $CNV_1$. That is, each converter unit 4 is electrically connected to the same DC link portion between the inverter unit 3 and converter unit 4.

Next, the arrangement of the inverter unit 3 will be explained by taking a U-phase inverter unit $INV_U$ as an example. The arrangements of a V-phase inverter unit $INV_V$ and W-phase inverter unit $INV_W$ are the same as this arrangement.

The U-phase inverter unit $INV_U$ is a neutral-point-clamped (NPC) device like the converter unit $CNV_1$. In the inverter unit $INV_U$, a full-bridge configuration is formed by electrically connecting two NPC legs in parallel. A DC link capacitor $C_{UP}$ is formed between the high-potential-side terminal and neutral-point-side terminal of the inverter unit $INV_U$. Also, a DC link capacitor $C_{UN}$ is formed between the neutral-point-side terminal and low-potential-side terminal of the inverter unit $INV_U$.

The high-potential-side terminals of the V-phase inverter unit $INV_V$ and W-phase inverter unit $INV_W$ are electrically connected to the high-potential-side terminal of the U-phase inverter unit $INV_U$.

The neutral-point-side terminals of the V-phase inverter unit $INV_V$ and W-phase inverter unit $INV_W$ are electrically connected to the neutral-point-side terminal of the U-phase inverter unit $INV_U$.

The low-potential-side terminals of the V-phase inverter unit $INV_V$ and W-phase inverter unit $INV_W$ are electrically connected to the low-potential-side terminal of the U-phase inverter unit $INV_U$. That is, the inverter units 3 of respective phases are electrically connected to the same DC link portion between the inverter units 3 and converter units 4.

The converter transformers, converter units 4, and inverter units 3 of the three phases, i.e., the UVW phases have the same voltage rating and current rating.

The AC windings of the converter transformers $TR_1$ and $TR_2$ are electrically connected in series in the order of the converter transformers $TR_1$ and $TR_2$. A converter transformer in the lowermost stage shown in FIG. 1 in the power converter of each phase is the converter transformer $TR_2$. Also, the converter transformer $TR_1$ in the uppermost stage shown in FIG. 1 is electrically connected to the three-phase AC power supply 1. In this arrangement, a voltage obtained by adding the output voltages from the converter units $CNV_1$ and $CNV_2$ to the power system is output to the power system.

Furthermore, each of the two output terminals from the inverter unit 3 of each phase to the wound rotor type induction generator 2 is electrically connected to a terminal corresponding to each of the three phases of the wound rotor type induction generator 2.

The arrangement of the inverter unit 3 shown in FIG. 1 will be explained in detail below. Although the U phase is taken as an example, the arrangements of the V- and W-phase inverter units are the same as this arrangement.

The U-phase inverter unit $INV_U$ shown in FIG. 1 includes eight switching elements $S_{UA1}$, $S_{UA2}$, $S_{UA3}$, $S_{UA4}$, $S_{UB1}$, $S_{UB2}$, $S_{UB3}$, and $S_{UB4}$. The inverter unit $INV_U$ also includes eight reflux diodes $D_{UA1}$, $D_{UA2}$, $D_{UA3}$, $D_{UA4}$, $D_{UB1}$, $D_{UB2}$, $D_{UB3}$, and $D_{UB4}$. These reflux diodes are electrically connected in anti-parallel to all the switching elements in one-to-one correspondence with them. The inverter unit $INV_U$ further includes four clamp diodes $D_{UA5}$, $D_{UA6}$, $D_{UB5}$, and $D_{UB6}$ electrically connected to the neutral point.

The switching elements $S_{UA1}$, $S_{UA2}$, $S_{UA3}$, and $S_{UA4}$, reflux diodes $D_{UA1}$, $D_{UA2}$, $D_{UA3}$, and $D_{UA4}$, and clamp diodes $D_{UA5}$ and $D_{UA6}$ form the first leg of the inverter unit $INV_U$.

The switching elements $S_{UA1}$, $S_{UA2}$, $S_{UA3}$, and $S_{UA4}$ are electrically connected in series from the high-potential side to the low-potential side of the inverter unit $INV_U$ in the order of $S_{UA1}$, $S_{UA2}$, $S_{UA3}$, and $S_{UA4}$. The anode of the clamp diode $D_{UA5}$ is electrically connected to the neutral point on the inverter unit $INV_U$ side. The cathode of the clamp diode $D_{UA5}$ is electrically connected to the connection point between the switching elements $S_{UA1}$ and $S_{UA2}$. The cathode of the clamp diode $D_{UA6}$ is electrically connected to the neutral point on the inverter unit $INV_U$ side. The anode of the clamp diode $D_{UA6}$ is electrically connected to the connection point between the switching elements $S_{UA3}$ and $S_{UA4}$.

The reflux diode $D_{UA1}$ is electrically connected in anti-parallel to the switching element $S_{UA1}$. The reflux diode $D_{UA2}$ is electrically connected in anti-parallel to the switching element $S_{UA2}$. The reflux diode $D_{UA3}$ is electrically connected in anti-parallel to the switching element $S_{UA3}$. The reflux diode $D_{UA4}$ is electrically connected in anti-parallel to the switching element $S_{UA4}$.

The switching elements $S_{UB1}$, $S_{UB2}$, $S_{UB3}$, and $S_{UB4}$, reflux diodes $D_{UB1}$, $D_{UB2}$, $D_{UB3}$, and $D_{UB4}$, and clamp diodes $D_{UB5}$ and $D_{UB6}$ form the second leg of the inverter unit $INV_U$.

The switching elements $S_{UB1}$, $S_{UB2}$, $S_{UB3}$, and $S_{UB4}$ are electrically connected in series from the high-potential side to the low-potential side of the inverter unit $INV_U$ in the order of $S_{UB1}$, $S_{UB2}$, $S_{UB3}$, and $S_{UB4}$. The anode of the clamp diode $D_{UB5}$ is electrically connected to the neutral point on the inverter unit $INV_U$ side. The cathode of the clamp diode $D_{UB5}$ is electrically connected to the connection point between the switching elements $S_{UB1}$ and $S_{UB2}$. The cathode of the clamp diode $D_{UB6}$ is electrically connected to the neutral point on the inverter unit $INV_U$ side. The anode of the clamp diode $D_{UB6}$ is electrically connected to the connection point between the switching elements $S_{UB3}$ and $S_{UB4}$.

The reflux diode $D_{UB1}$ is electrically connected in anti-parallel to the switching element $S_{UB1}$. The reflux diode $D_{UB2}$ is electrically connected in anti-parallel to the switching element $S_{UB2}$. The reflux diode $D_{UB3}$ is electrically connected in anti-parallel to the switching element $S_{UB3}$. The reflux diode $D_{UB4}$ is electrically connected in anti-parallel to the switching element $S_{UB4}$.

That is, the inverter unit $INV_U$ is an NPC full-bridge power converter. In this NPC full-bridge power converter, the two legs are formed by electrically connecting the switching elements $S_{UA1}$, $S_{UA2}$, $S_{UA3}$, and $S_{UA4}$ in series, and the switching elements $S_{UB1}$, $S_{UB2}$, $S_{UB3}$, and $S_{UB4}$ in series.

Also, a potential difference $V_{UA} - V_{UB}$ between a connection-point potential $V_{UA}$ of the switching elements $S_{UA2}$ and $S_{UA3}$ and a connection-point potential $V_{UB}$ of the switching elements $S_{UB2}$ and $S_{UB3}$ is output to the wound rotor type induction generator 2. This potential difference means a PWM voltage.

Details of the arrangement of each converter unit 4 shown in FIG. 1 will be explained below.

Although the first converter unit $CNV_1$ will be explained, the arrangement of the second converter unit $CNV_2$ is the same.

The first converter unit $CNV_1$ includes twelve switching elements $S_{R1}$, $S_{R2}$, $S_{R3}$, $S_{R4}$, $S_{S1}$, $S_{S2}$, $S_{S3}$, $S_{S4}$, $S_{T1}$, $S_{T2}$, $S_{T3}$, and $S_{T4}$. The converter unit $CNV_1$ includes twelve reflux diodes $D_{R1}$, $D_{R2}$, $D_{R3}$, $D_{R4}$, $D_{S1}$, $D_{S2}$, $D_{S3}$, $D_{S4}$, $D_{T1}$, $D_{T2}$, $D_{T3}$, and $D_{T4}$. These reflux diodes are electrically connected in anti-parallel to all the switching elements in one-to-one correspondence with them. The converter unit $CNV_1$ further includes six clamp diodes $D_{R5}$, $D_{R6}$, $D_{S5}$, $D_{S6}$, $D_{T5}$, and $D_{T6}$ electrically connected to the neutral point on the converter unit $CNV_1$ side.

More specifically, the switching elements $S_{R1}$, $S_{R2}$, $S_{R3}$, and $S_{R4}$, reflux diodes $D_{R1}$, $D_{R2}$, $D_{R3}$, and $D_{R4}$, and clamp diodes $D_{R5}$ and $D_{R6}$ form the R-phase leg of the converter unit $CNV_1$.

The switching elements $S_{R1}$, $S_{R2}$, $S_{R3}$, and $S_{R4}$ are electrically connected in series from the high-potential side to the low-potential side of the converter unit $CNV_1$ in the order of the switching elements $S_{R1}$, $S_{R2}$, $S_{R3}$, and $S_{R4}$.

The anode of the clamp diode $D_{R5}$ is electrically connected to the neutral point of the converter unit $CNV_1$. The cathode of the clamp diode $D_{R5}$ is electrically connected to the connection point between the switching elements $S_{R1}$ and $S_{R2}$. The cathode of the clamp diode $D_{R6}$ is electrically connected to the neutral point of the converter unit $CNV_1$. The anode of the clamp diode $D_{R6}$ is electrically connected to the connection point between the switching elements $S_{R3}$ and $S_{R4}$.

The reflux diode $D_{R1}$ is electrically connected in anti-parallel to the switching element $S_{R1}$. The reflux diode $D_{R2}$ is electrically connected in anti-parallel to the switching element $S_{R2}$. The reflux diode $D_{R3}$ is electrically connected in anti-parallel to the switching element $S_{R3}$. The reflux diode $D_{R4}$ is electrically connected in anti-parallel to the switching element $S_{R4}$.

The switching elements $S_{S1}$, $S_{S2}$, $S_{S3}$, and $S_{S4}$, reflux diodes $D_{S1}$, $D_{S2}$, $D_{S3}$, and $D_{S4}$, and clamp diodes $D_{S5}$ and $D_{S6}$ form the S-phase leg of the converter unit $CNV_1$. More specifically, the switching elements $S_{S1}$, $S_{S2}$, $S_{S3}$, and $S_{S4}$ are electrically connected in series from the high-potential side to the low-potential side of the converter unit $CNV_1$ in the order of the switching elements $S_{S1}$, $S_{S2}$, $S_{S3}$, and $S_{S4}$.

The anode of the clamp diode $D_{S5}$ is electrically connected to the neutral point of the converter unit $CNV_1$. The cathode of the clamp diode $D_{S5}$ is electrically connected to the connection point between the switching elements $S_{S1}$ and $S_{S2}$. The cathode of the clamp diode $D_{S6}$ is electrically connected to the neutral point of the converter unit $CNV_1$. The anode of the clamp diode $D_{S6}$ is electrically connected to the connection point between the switching elements $S_{S3}$ and $S_{S4}$.

The reflux diode $D_{S1}$ is electrically connected in anti-parallel to the switching element $S_{S1}$. The reflux diode $D_{S2}$ is electrically connected in anti-parallel to the switching element $S_{S2}$. The reflux diode $D_{S3}$ is electrically connected in anti-parallel to the switching element $S_{S3}$. The reflux diode $D_{S4}$ is electrically connected in anti-parallel to the switching element $S_{S4}$.

The switching elements $S_{T1}$, $S_{T2}$, $S_{T3}$, and $S_{T4}$, reflux diodes $D_{T1}$, $D_{T2}$, $D_{T3}$, and $D_{T4}$, and clamp diodes $D_{T5}$ and $D_{T6}$ form the T-phase leg of the converter unit $CNV_1$. More specifically, the switching elements $S_{T1}$, $S_{T2}$, $S_{T3}$, and $S_{T4}$ are electrically connected in series from the high-potential side to the low-potential side of the converter unit $CNV_1$ in the order of the switching elements $S_{T1}$, $S_{T2}$, $S_{T3}$, and $S_{T4}$.

The anode of the clamp diode $D_{T5}$ is electrically connected to the neutral point of the converter unit $CNV_1$. The cathode of the clamp diode $D_{T5}$ is electrically connected to the connection point between the switching elements $S_{T1}$ and $S_{T2}$. The cathode of the clamp diode $D_{T6}$ is electrically connected to the neutral point of the converter unit $CNV_1$. The anode of the clamp diode $D_{T6}$ is electrically connected to the connection point between the switching elements $S_{T3}$ and $S_{T4}$.

The reflux diode $D_{T1}$ is electrically connected in anti-parallel to the switching element $S_{T1}$. The reflux diode $D_{T2}$ is electrically connected in anti-parallel to the switching element $S_{T2}$. The reflux diode $D_{T3}$ is electrically connected in anti-parallel to the switching element $S_{T3}$. The reflux diode $D_{T4}$ is electrically connected in anti-parallel to the switching element $S_{T4}$.

That is, the converter unit $CNV_1$ is a three-phase NPC power converter. This three-phase NPC power converter forms three legs by electrically connecting the R-phase switching elements $S_{R1}$, $S_{R2}$, $S_{R3}$, and $S_{R4}$ in series, the S-phase switching elements $S_{S1}$, $S_{S2}$, $S_{S3}$, and $S_{S4}$ in series, and the T-phase switching elements $S_{T1}$, $S_{T2}$, $S_{T3}$, and $S_{T4}$ in series.

Note that the three-phase voltage is output to the DC winding of the converter transformer $T_{R1}$. This three-phase voltage contains a connection-point potential $V_R$ of the R-phase leg, a connection-point potential $V_S$ of the S-phase leg, and a connection-point potential $V_T$ of the T-phase leg of the converter unit $CNV_1$.

The connection-point potential $V_R$ is the connection-point potential of the switching elements $S_{R2}$ and $S_{R3}$ of the R-phase leg of the converter unit $CNV_1$. The connection-point potential $V_S$ is the connection-point potential of the switching elements $S_{S2}$ and $S_{S3}$ of the S-phase leg of the converter unit $CNV_1$. The connection-point potential $V_T$ is the connection-point potential of the switching elements $S_{T2}$ and $S_{T3}$ of the T-phase leg of the converter unit $CNV_1$.

In this embodiment, the converter unit $CNV_1$ is electrically connected to the DC winding side of the converter transformer $T_{R1}$ by a $\Delta$ connection, and three-phase line voltages $V_R - V_S$, $V_S - V_T$, and $V_T - V_R$ are output to the AC winding side of the converter transformer $T_{R1}$.

Next, a voltage output method using the inverter units 3 will be explained by taking the U-phase inverter unit $INV_U$ as an example.

The inverter unit $INV_U$ has a full-bridge configuration. Letting $V_{DC}$ be the DC voltage of the inverter unit $INV_U$, therefore, the inverter unit $INV_U$ can output five levels of DC voltages, i.e., $-V_{DC}$, $-V_{DC}/2$, 0, $+V_{DC}/2$, and $+V_{DC}$.

A method of driving the switching elements $S_{UA1}$, $S_{UA2}$, $S_{UA3}$, $S_{UA4}$, $S_{UB1}$, $S_{UB2}$, $S_{UB3}$, and $S_{UB4}$ of the inverter unit $INV_U$ will be described below.

In this embodiment, the secondary excitation system of the wound rotor type induction generator includes a controller 10 as shown in FIG. 1. The controller 10 controls ON/OFF of the switching elements of the inverter unit 3, and ON/OFF of the switching elements of the converter unit 4.

When the controller 10 selectively controls ON/OFF of the switching elements $S_{UA1}$, $S_{UA2}$, $S_{UA3}$, $S_{UA4}$, $S_{UB1}$, $S_{UB2}$, $S_{UB3}$, and $S_{UB4}$, the inverter unit $INV_U$ outputs the voltage difference $V_{UA}-V_{UB}$ to the wound rotor type induction generator 2. By this output, the above-described five levels, i.e., the voltages $-V_{DC}$, $-V_{DC}/2$, 0, $+V_{DC}/2$, and $+V_{DC}$ are applied to the wound rotor type induction generator 2.

The controller 10 complementarily operates the switching elements $S_{UA1}$ and $S_{UA3}$ of the first leg in the inverter unit $INV_U$. The controller 10 complementarily operates the switching elements $S_{UA2}$ and $S_{UA4}$ of the same leg. Also, in this embodiment, the controller 10 complementarily operates the switching elements $S_{UB1}$ and $S_{UB3}$ of the second leg in the inverter unit $INV_U$. The controller 10 complementarily operates the switching elements $S_{UB2}$ and $S_{UB4}$ of the same leg.

In the secondary excitation system of the wound rotor type induction generator of this embodiment, a PWM voltage $V_{UA}-V_{UB}$ corresponding to an inverter U-phase voltage command value $V_U^*$ from the controller 10 is output from the inverter unit $INV_U$ by using triangular-wave carrier modulation.

Furthermore, the phases of the voltage command values for the inverter units $INV_U$, $INV_V$, and $INV_W$ are shifted from each other by 120°.

That is, in the secondary excitation system of the wound rotor type induction generator of this embodiment, a PWM voltage $V_{VA}-V_{VB}$ corresponding to an inverter V-phase voltage command value $V_V^*$ from the controller 10 is output from the inverter unit $INV_V$ by using triangular-wave carrier modulation. Also, in the secondary excitation system of the wound rotor type induction generator of this embodiment, a PWM voltage $V_{WA}-V_{WB}$ corresponding to an inverter W-phase voltage command value $V_W^*$ from the controller 10 is output from the inverter unit $INV_W$ by using triangular-wave carrier modulation.

As described above, the operations of the inverter units $INV_U$, $INV_V$, and $INV_W$ are the same except that the phases of the voltage command values are shifted.

A voltage output method using the converter unit 4 will now be explained by taking the first converter unit $CNV_1$ as an example. A voltage output method using the second converter unit $CNV_2$ is the same.

The first converter unit $CNV_1$ has a three-phase, half-bridge configuration. Therefore, a voltage output method for each phase of the power system will be described by taking the leg for outputting the R-phase voltage of the system voltage as an example.

The R-phase leg of the converter unit $CNV_1$ outputs a voltage by controlling ON/OFF of the switching elements $S_{R1}$, $S_{R2}$, $S_{R3}$, and $S_{R4}$. This DC voltage is a voltage having three levels, i.e., $-V_{DC}/2$, 0, and $+V_{DC}/2$.

The controller 10 complementarily operates the switching elements $S_{R1}$ and $S_{R3}$ of the R-phase leg in the first converter unit $CNV_1$. Also, the controller 10 complementarily operates the switching elements $S_{R2}$ and $S_{R4}$ of the R-phase leg in the first converter unit $CNV_1$.

Next, the R-phase voltage $V_R$ output method including the converter units $CNV_1$ and $CNV_2$ will be explained.

The AC windings of the converter transformers $TR_1$ and $TR_2$ are electrically connected in series. Therefore, the R-phase voltage $V_R$ is obtained based on the R-phase output voltages of the converter units $CNV_1$ and $CNV_2$.

In this embodiment, the phases on the AC sides of the inverter units 3 are electrically independent. Therefore, no shortcircuit loop is formed via the inverter units 3 of these phases. Accordingly, the ON/OFF states of the switching elements forming the inverter unit 3 of each phase are not particularly limited.

Also, the three single-phase inverter units 3 are electrically connected to the same DC link portion. Even when the frequency of the excitation circuit is low, therefore, the inverter units 3 of the respective phases operate so as to cancel the pulsations of the electric power.

Accordingly, when ordinary PWM control is performed, the converter unit (PWM rectifier) 4 for supplying electric power to the DC link portion can hold the DC link voltage constant.

In addition, it is unnecessary to perform any high-speed control on the switching element of the converter unit 4, the switching frequency of this semiconductor element can be decreased. As a consequence, it is possible to reduce a loss produced by switching of the switching element.

In this embodiment, the number of converter units 4 is not particularly limited, and it is possible to perform electrical series or parallel connection in accordance with the AC voltage and DC link voltage.

This embodiment uses a neutral-point-clamped, three-level semiconductor power converter. However, the present invention is not limited to this, and it is also possible to use a two-level semiconductor power converter having no neutral point if the output voltage is not so high.

Furthermore, in this embodiment, a case in which electric power flows out from the wound rotor type induction generator 2 has been explained. However, the present invention is not limited to this, and it is also possible to apply the embodiment to a case in which electric power flows into the wound rotor type induction generator 2 and a mechanical output is obtained from the wound rotor type induction generator 2.

Second Embodiment

The second embodiment will be explained below. Note that in the arrangement of each of the following embodiments, an explanation of the same portions as shown in FIG. 1 will be omitted.

In the second embodiment, a secondary-side OVP (Over Voltage Protection) circuit is formed in the circuit system explained in the first embodiment.

FIG. 2 is a view showing an installation example of the OVP circuit in a secondary excitation system of a wound rotor type induction generator according to the second embodiment. FIG. 2 shows an example using a two-level semiconductor power converter.

As shown in FIG. 2, in the secondary excitation system of the wound rotor type induction generator according to the second embodiment, OVP circuits 11, 12, and 13 are formed between a wound rotor type induction generator 2 and inverter units 3 of respective phases.

As shown in FIG. 2, the OVP circuit 11 is obtained by electrically connecting semiconductor elements 11a and 11b such as thyristors in anti-parallel to each other. The OVP circuits 12 and 13 have the same arrangement.

The OVP circuit 11 is electrically connected in parallel to the U-phase excitation winding of the wound rotor type induction generator 2, between the wound rotor type induction generator 2 and a U-phase inverter unit.

The OVP circuit 12 is electrically connected in parallel to the V-phase excitation winding of the wound rotor type induction generator 2, between the wound rotor type induction generator 2 and a V-phase inverter unit.

The OVP circuit 13 is electrically connected in parallel to the W-phase excitation winding of the wound rotor type induction generator 2, between the wound rotor type induction generator 2 and a W-phase inverter unit.

If a ground fault or shortcircuit occurs in the power system, an electric current much larger than that in a normal operation may flow through the primary side (stator side) of the wound rotor type induction generator 2.

If this is the case, an over voltage is generated by electromagnetic induction on the secondary side (rotor side) of the wound rotor type induction generator 2. In this case, even when the inverter unit 3 forming an excitation circuit is stopped, electric power flows into a DC link portion via a diode electrically connected in parallel to a switching element in the inverter unit 3, thereby raising the voltage of this DC link portion.

In the second embodiment, therefore, if an over voltage detector 10a detects that the amplitude of the secondary-side voltage of the wound rotor type induction generator 2 or the voltage of the DC link portion exceeds a preset value, a stop control unit 10b of a controller 10 stops a gate signal to the switching element of the inverter unit 3 of each phase, thereby stopping the inverter unit 3.

Then, the stop control unit 10b of the controller 10 supplies an ignition command to the semiconductor elements forming the OVP circuits 11, 12, and 13 of the respective phases, thereby shortcircuiting the secondary-side windings of the wound rotor type induction generator 2. This makes it possible to suppress the electric power from flowing into the DC link portion. After the ignition command, the wound rotor type induction generator 2 is electrically connected as a perfect inductor to the power system.

In the second embodiment as described above, if an over voltage is generated on the secondary side of the wound rotor type induction generator 2, the OVP circuit electrically connected in parallel to the excitation winding is operated. This makes it possible to suppress the electric power from flowing into the DC link portion of the secondary excitation system, thereby suppressing the rise in voltage of the DC link portion.

Accordingly, it is possible to avoid element destruction caused in the inverter unit 3 or a converter unit (PWM rectifier) 4 by an over voltage.

Third Embodiment

Next, the third embodiment will be explained.

FIG. 3 is a view showing an installation example of OVP circuits of a secondary excitation system of a wound rotor type induction generator according to the third embodiment. FIG. 3 shows an example using a two-level semiconductor power converter.

As shown in FIG. 3, in the secondary excitation system of the wound rotor type induction generator according to the third embodiment, OVP circuits 21 and 22 are formed between a wound rotor type induction generator 2 and inverter units 3 of respective phases.

As shown in FIG. 3, an OVP circuit 21 includes three semiconductor elements 21a, 21b, and 21c. The arrangement of the OVP circuit 22 is the same.

Assume that the semiconductor elements 21a, 21b, and 21c are thyristors. The anode of the semiconductor element 21a forms the first terminal of the OVP circuit 21. The cathode of the semiconductor element 21a is electrically connected to the anode of the semiconductor element 21b, and forms the second terminal of the OVP circuit 21.

The cathode of the semiconductor element 21b forms the third terminal of the OVP circuit 21, and is electrically connected to the anode of the semiconductor element 21c. The cathode of the semiconductor element 21c is electrically connected to the anode of the semiconductor element 21a.

The first terminal of the OVP circuit 21 is electrically connected to a portion (high-potential point) which generates a connection-point potential $V_{UA}$ of a U-phase inverter unit $INV_U$. The second terminal of the OVP circuit 21 is electrically connected to a high-potential point which generates a connection-point potential $V_{VA}$ of a V-phase inverter unit $INV_V$. The third terminal of the OVP circuit 21 is electrically connected to a high-potential point which generates a connection-point potential $V_{WA}$ of a W-phase inverter unit $INV_W$.

Also, the first terminal of the OVP circuit 22 is electrically connected to a portion (low-potential point) which generates a connection-point potential $V_{UB}$ of the U-phase inverter unit $INV_U$. The second terminal of the OVP circuit 22 is electrically connected to a low-potential point which generates a connection-point potential $V_{VB}$ of the V-phase inverter unit $INV_V$. The third terminal of the OVP circuit 22 is electrically connected to a low-potential point which generates a connection-point potential $V_{WB}$ of the W-phase inverter unit $INV_W$.

In the third embodiment, the OVP circuits 21 and 22 are respectively installed on the high-potential side and low-potential side of the inverter units 3 of the respective phases, in order to shortcircuit both ends of the three excitation windings of the wound rotor type induction generator 2.

In the third embodiment, when a controller 10 supplies an ignition command to the semiconductor elements of the OVP circuit 22, the neutral points of the three excitation windings of the wound rotor type induction generator 2 can electrically be connected. Consequently, the connection of the excitation windings of the respective phases of the wound rotor type induction generator 2 is the same star connection as that of an ordinary wound rotor type induction generator, so the potentials of the excitation windings of the respective phases can be made equal.

Also, the phases of the excitation windings of the wound rotor type induction generator 2 can be shortcircuited by the controller 10 by supplying the ignition command to the semiconductor elements of the OVP circuit 21.

When an over voltage detector 10a of the controller 10 detects the over voltage of the DC link portion or the excitation winding of the wound rotor type induction generator 2, a stop control unit 10b of the controller 10 stops a gate signal to the switching elements of the inverter units 3 of the respective phases, thereby stopping the inverter units 3.

Then, the stop control unit 10b supplies an ignition command to the semiconductor elements forming the OVP circuits 21 and 22.

Thus, it is possible to suppress electric power from flowing into the DC link portion, and suppress the generation of an over voltage. As in the second embodiment, after the ignition command, the wound rotor type induction generator 2 is electrically connected as a perfect inductor to the power system.

In the third embodiment as described above, the potentials of the three excitation windings of the wound rotor type induction generator 2 can be made equal, in addition to the features explained in the second embodiment. When designing the wound rotor type induction generator 2, therefore, it is unnecessary to take account of, e.g., the dielectric strength between the windings of the respective phases. It is also possible to decrease the number of secondary-side over voltage protection circuits compared to the second embodiment.

In each of the above embodiments, the fluctuation in DC link voltage can be reduced without increasing the capacity of the DC link capacitor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A generator excitation apparatus comprising:
a plurality of first power converters electrically connected to windings of respective three phases of a rotor of a wound rotor type induction generator in which the windings of the three phases of the rotor are electrically independent, and configured to bidirectionally convert DC and AC; and
a second power converter configured to bidirectionally convert DC and AC between DC sides of the first power converters and a three-phase AC power supply,
wherein the DC sides of the first power converters are electrically connected together to a DC side of the second power converter.

2. The apparatus according to claim 1, wherein
the second power converter converts a three-phase AC voltage output from the three-phase AC power supply into a DC voltage, and
the first power converter converts the DC voltage converted by the second power converter into a single-phase AC voltage corresponding to each phase of the wound rotor type induction generator.

3. The apparatus according to claim 1, wherein
the first power converters each comprise, for each of the three phases of the wound rotor type induction generator, a circuit including a plurality of switching elements electrically connected in series and divided by a neutral point, and
the second power converter comprises a circuit, including a plurality of switching elements electrically connected in series and divided by a neutral point.

4. The apparatus according to claim 1, further comprising over voltage protection circuits formed on AC sides of the first power converters, and configured to shortcircuit, for the respective three phases, the windings of the rotor of the wound rotor type induction generator when an over voltage is applied to the windings.

5. The apparatus according to claim 1, further comprising:
a stop control unit configured to stop the first power converter when an over voltage is applied to the winding of the rotor of the wound rotor type induction generator;
a first over voltage protection circuit electrically connected to high-potential sides of the respective three phases on AC sides of the first power converters, and configured to shortcircuit one-end sides of the windings of the respective three phases of the wound rotor type induction generator with the first power converters being stopped; and
a second over voltage protection circuit electrically connected to low-potential sides of the respective three phases on the AC sides of the first power converters, and configured to shortcircuit the other-end sides of the windings of the respective three phases of the wound rotor type induction generator with the first power converters being stopped.

6. A power conversion system comprising:
a wound rotor type induction generator in which windings of three phases of a rotor are electrically independent;
a plurality of first power converters electrically connected to the windings of the respective three phases of the rotor of the wound rotor type induction generator, and configured to bidirectionally convert DC and AC; and
a second power converter configured to bidirectionally convert DC and AC between DC sides of the first power converters and an AC power supply,
wherein the DC sides of the first power converters are electrically connected together to a DC side of the second power converter.

* * * * *